United States Patent [19]

Poklacki

[11] 4,007,128
[45] Feb. 8, 1977

[54] POLYAMINE SALTS OF ALUMINUM ALKYL ORTHOPHOSPHATES

[75] Inventor: Erwin Sigmund Poklacki, Arlington Heights, Ill.

[73] Assignee: Borg-Warner Corporation, Chicago, Ill.

[22] Filed: Nov. 28, 1975

[21] Appl. No.: 636,348

[52] U.S. Cl. .......................... 252/316; 252/8.55 R; 260/33.6 EP; 44/7 D; 166/276
[51] Int. Cl.$^2$ ......................................... B01J 13/00
[58] Field of Search ............... 252/316, 8.55 R, 37, 252/32.5; 44/7 D; 260/33.6 EP; 166/276

[56] References Cited

UNITED STATES PATENTS

| 3,338,935 | 8/1967 | Kerschner et al. | 260/429.5 |
| 3,575,859 | 4/1971 | Monroe | 252/32.5 |
| 3,757,864 | 9/1973 | Crawford et al. | 252/8.55 R X |

*Primary Examiner*—Richard D. Lovering
*Assistant Examiner*—E. Suzanne Parr
*Attorney, Agent, or Firm*—Richard J. Schlott

[57] ABSTRACT

Gelled hydrocarbon compositions comprising a liquid hydrocarbon, a partial aluminum salt of an alkyl acid orthophosphate and a neutralizing amount of a polyamine which retain gel character in the presence of epoxy resins and aromatic diamines and a method for their preparation.

6 Claims, No Drawings

POLYAMINE SALTS OF ALUMINUM ALKYL ORTHOPHOSPHATES

BACKGROUND OF THE INVENTION

This invention is directed to gelled hydrocarbon compositions prepared from partial aluminum salts of alkyl acid orthophosphates neutralized with polyamine compounds. More particularly this invention is directed to gelled hydrocarbon compositions comprising liquid hydrocarbons and gelling agents prepared from partial aluminum salts of alkyl acid orthophosphates neutralized with polyamines, which may further comprise uncured epoxy resins and amine curing agents for the epoxy component.

Partial aluminum salts of certain alkyl acid orthophosphates, when further neutralized with an inorganic base such as sodium hydroxide, ammonium hydroxide or the like, form pseudo double salts which are effective gelling agents. Hydrocarbon gels formed with these pseudo double salts are thixotropic, exhibiting high viscosity at rest and under low shear conditions and thus are capable of suspending large quantities of particulates such as sand without settling. These gels, even at very low concentrations, exhibit the ability to reduce fluid friction of hydrocarbons during high speed flow through pipes and orifices, decreasing the energy required to maintain fluid flow.

While these pseudo double salts have found a variety of applications where thixotropic gel properties and/or reductions in fluid friction are desired, their utility has been somewhat limited by a high degree of sensitivity both to alkalis and to acidic materials. The hydrocarbon gels are formed only at or very near a neutral pH, and the presence of excess base, or of acidic materials either prevents formation of a gel or quickly destroys the gels once they are formed. For that reason it has not been possible to employ these pseudo double salts to prepare gelled compositions containing as suspended or dissolved components such materials as epoxy resins with the commonly employed curatives. Additionally, the gels formed from the pseudo salts are thinned by heating, and after extended periods at elevated temperatures lose much of the gel character.

SUMMARY OF THE INVENTION

It has now been found that partial aluminum salts of alkyl acid orthophosphates when reacted with organic polyamines give products capable of gelling hydrocarbons. More particularly, partial aluminum salts of alkyl acid orthophosphates, prepared by reacting less than a stoichiometric quantity of a basic aluminum compound such as hydrated alumina with an alkyl acid orthophosphate, when further reacted with an aliphatic or aromatic amine compound having two or more amine groups will gel hydrocarbons.

DETAILED DESCRIPTION

The alkyl acid orthophosphates useful for the practice of this invention are the products of the reaction of alcohols with phosphorus pentoxide ($P_2O_5$). More particularly, they may be characterized as mixtures of monoalkyl diacid orthophosphates and dialkyl monoacid phosphates resulting from the reaction of mixed alcohols with $P_2O_5$ according to the classical formula:

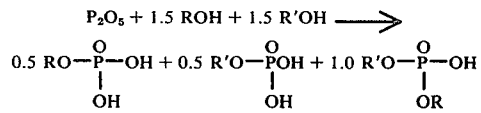

wherein R is a $C_1$–$C_5$ alkyl radical, and ROH is thereby a $C_1$–$C_5$ alkanol or a mixture thereof, R' is a $C_6$–$C_{22}$ alkyl or alkenyl radical, and R'OH is thereby a $C_6$–$C_{22}$ alkanol or alkenol or a mixture thereof. It will be understood that an excess of the alcohols relative to the quantity of $P_2O_5$ may also be employed to hasten the reaction and to ensure complete conversion.

Whatever alcohols are employed, it will be seen that the product alkyl acid orthophosphate mixture will contain three reactive acidic groups for every two atoms of phosphorus, which may be represented by the formula $H_3$[alkyl orthophosphate]$_2$. This acidic structure will thus require three equivalents of a reactive base to completely neutralize the remaining acidity.

The partial aluminum salt of the alkyl acid orthophosphate is prepared by reacting less than a stoichiometric quantity of a basic aluminum compound such as hydrated alumina [Al(OH)$_3$] or aluminum isopropoxide [Al(OC$_3$H$_7$)$_3$] with the alkyl acid orthophosphate. The amount of basic aluminum compound employed may be varied between about 20 and about 70%, preferably between 20 and 50% of the stoichiometric amount, i.e. the amount required to fully neutralize the acidity of the alkyl acid orthophosphate. It has been found that the resulting partial aluminum salts containing less than about 20% of the stoichiometric amount of the aluminum component give very poor quality gels upon subsequent neutralization with the polyamine. At increasing levels of the aluminum component the partial aluminum salts become increasingly waxy in character and above about 50% of the stoichiometric quantity are more difficult to dissolve in the hydrocarbon. With further increases in the aluminum component, particularly above about 70%, the partial aluminum salts are hard waxy materials which are dissolved or dispersed hydrocarbons only with great difficulty, normally requiring prolonged stirring and heating.

The salt-forming reaction is carried out by mixing the basic aluminum compound and the alkyl acid orthophosphate and mildly heating the mixture to complete the reaction, e.g. from about 100° to about 250° F. While the process may be carried out in the absence of solvent, inert diluents such as kerosene, diesel fuel, aromatic hydrocarbons or naphtha may be employed if desired to moderate the reactions.

The resulting partial aluminum salts, which remain acidic in character by virtue of the incomplete stoichiometry employed, may be represented by the formula:

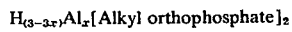

wherein $x$ is 0.2 to 0.70, as determined by the amount of basic aluminum compound used in their preparations. In terms of the ratio of P to Al, these salts have a P/Al ratio between 10/1 and 2.86/1. These complex compounds do not alone produce gels or more than a minor amount of thickening when dissolved or dispersed in hydrocarbons. To form a gel, it is necessary that the remaining acidity be neutralized.

The polyamine used to neutralize the remaining acidity and thus form hydrocarbon gels may be any organic amine containing two or more amine groups. Aliphatic polyamines useful for these purposes include ethylene diamine and the dimers trimers and tetramers thereof, i.e., diethylene triamine, triethylene tetramine, tetraethylene pentamine, and the like. Similarly, the propylene diamine analogs may be employed, and higher molecular weight analogs including low molecular weight poly(ethylene imine) are also useful. Poly-functional aromatic amines such as phenylene diamine, methylene dianiline, oxydianiline and the like may also be employed.

Aliphatic monoamines such as triethylamine and the like are not suitable for the purposes of this invention. While these monoamines are basic compounds capable of neutralizing the remaining acidity, the resulting mixtures exhibit none of the gel properties necessary to the practice of this invention. It is surprising and unexpected that only the polyamines are effective for these purposes, since simple inorganic bases such as sodium hydroxide and ammonia are quite effective in this regard.

The neutralization and gel-forming step will normally be carried out by first dissolving or dispersing the partial aluminum salt into a liquid hydrocarbon, then adding the requisite amount of amine while subjecting the mixture to high shear stirring. Thickening of the mixture will take place as the neutralization proceeds, however, gelation of the mass will occur only at or very near the point where addition of polyamine is complete. Where the strongly basic polyamines, i.e. the aliphatic polyamines such as diethylene triamine, are employed it is essential that no excess amine be added because an excess of a strong base will destroy the gel structure. The weakly-basic aromatic polyamines such as phenylene diamine may be employed in excess if desired, inasmuch as these are not capable of destroying the gel when formed. It is also possible to employ the aliphatic polyamine and the aromatic polyamine simultaneously by forming the gel with the strongly basic amine and adding the weakly-basic aromatic amine to establish an excess if desired.

The viscosity and strength of the resulting gel will depend in part upon the amount of gelling agent employed. Gels are formed at concentrations as low as 0.1 wt. % of the gelling additive based on the final composition, and nearly solid immobile gels are formed at greater concentrations. While it is possible to form gels containing as much as 90% by weight gelling agent, as a practical matter at concentrations above about 10% by weight the gels are immobile and of little utility. The gel character of these compositions is retained at even lower concentrations although the gel properties in the range 0.1 to 0.025 wt. % are difficult to ascertain except by measurement of the bulk physical properties of the composition. Nonetheless, mixtures containing the gel at these low concentrations exhibit useful rheological properties including a marked reduction in fluid friction behavior when in high shear flow. It may be desirable, particularly when making low concentration gels, to prepare gels having 1.0 wt. % or greater gelling agent as described above and then further dilute the gel by admixing with additional volumes of liquid hydrocarbon.

The practice of the present invention is further illustrated by means of the following examples which are not to be construed as limiting the scope of the invention.

EXAMPLE 1

A partial aluminum salt of an alkyl acid orthophosphate was prepared in the following manner: 112 g. of $P_2O_5$ were mixed with 74.7 g. of butyl alcohol and 299.3 g. (1.7 m) of a commercial mixture of $C_{12}$–$C_{22}$ n-alkanols. The reaction mixture was heated gently to a gentle reflux and stirred until all the $P_2O_5$ had reacted.

The resulting mixture of alkyl acid orthophosphates was then reacted with 25.8 g. (42% of stoichiometry) of hydrated alumina by mixing the components and heating the mixture at 110° C. for about an hour. The resulting partial aluminum salt was a viscous oil.

The partial aluminum salt, when dispersed in diesel fuel, at a level of 2 wt. % appeared to dissolve completely without producing any measurable increase in viscosity.

EXAMPLE 2

An alkyl acid orthophosphate was prepared from 53.8 g. of $P_2O_5$, 29.3 g. of n-butyl alcohol and 102 g. of a commercial mixture of n-octanol, n-hexanol and n-decanol, substantially as described in Example 1. One hundred grams of the resulting mixture were then reacted with 9.76 g. (33% of theory) of hydrated alumina by heating the mixture at 110° C. for approximately one hour, while water was allowed to evaporate. The resulting partial aluminum salt, when cooled, was a viscous oil. When dispersed in diesel fuel at a level of 2 wt. %, no visible increase in viscosity occurred.

EXAMPLES 3 – 8

The partial aluminum salts of Examples 1 and 2 were employed in the preparation of the gels employing the formulations shown in Table I. The gels were formed by first dispersing the indicated amount of partial aluminum salt in 250 ml of diesel fuel, then placing the mixture in a Waring Blendor and stirring at high speed while adding the given amount of amine.

TABLE I

| Example No. | Gelling Agent | Amount | Amine[1] | Amount | Result |
|---|---|---|---|---|---|
| 3 | Example 1 | 2 g. | TEPA | 0.3 ml. | Gel |
| 4 | Example 1 | 2 g. | TETA | 0.25 ml. | Gel |
| 5 | Example 1 | 2 g. | MDA PDA | 0.75 g. | Gel |
| 6 | Example 2 | 2 g. | TETA | 0.4 ml. | Gel |
| 7 | Example 2 | 2 g. | MDA PDA | 0.83 g. | Gel |
| 8 | Example 2 | 2 g. | TEPA | 0.6 ml. | Gel |

Notes:
(1) TEPA = Tetraethylene pentamine;
 TETA = Triethylene tetramine;
 MDA = Methylene diamine;
 PDA = m-phenylene diamine.

EXAMPLE 9

As a control, 2 g. of the gelling agent of Example 1 were dispersed in 250 ml. of diesel fuel and triethylamine (TEA) was added incrementally with high speed stirring in a Waring Blendor. There was no noticable thickening or gel formation after the addition of 0.2, 0.4, 0.6 and 0.8 ml. of TEA. Thus, it will be seen that a simple monoamine is ineffective for the purposes of this invention.

It will be seen that gels are formed only with polyamines, as shown in Examples 3 – 8.

EXAMPLE 10

To the gel of Example 7, prepared from of the partial aluminum salt of Example 2 in 250 ml. of diesel fuel, was added an additional 3.1 g. quantity of the mixture of methylene dianiline and m-phenylene diamine, with stirring. The gel character was retained, showing that an excess of aromatic polyamines do not destroy the gel.

EXAMPLE 11

A mixture of 200 ml. of diesel fuel containing 2 ml. of the partial aluminum salt of Example 2 was gelled by neutralizing with 30% aqueous caustic (NaOH). To this gel were then added 3.5 g. of the methylene dianiline-m-phenylene diamine mixture. The gel character was retained, showing that excess aromatic amine will not destroy a caustic-neutralized gel.

EXAMPLE 12

As a control, a mixture of 200 ml. diesel fuel containing 2 ml. of the partial aluminum salt of Example 2 was gelled by neutralizing with 30% aqueous caustic (NaOH). Two drops of caustic in excess were then added, which completely destroyed the gel character.

EXAMPLE 13

A mixture of 98.8 g. of diesel fuel and 1.2 g. of the partial aluminum salt of Example 2 was placed in a Waring Blendor and stirred at high speed while 0.75 g. of a mixture of methylene dianiline and m-phenylene diamine were added. The resulting viscous gel was then placed in a beaker and heated at 210° F. for 168 hours. Upon cooling, the mixture recovered most of the initial gel characteristics.

As a control, a caustic-neutralized gel prepared as in Example 13 was heated at 210° F. for 168 hours. Upon cooling, the mixture had lost all gel character.

EXAMPLE 14

The gel prepared with excess aromatic polyamine in Example 11 was mixed with a solution of 34.1 g. of Epon 820 brand epoxy resin from Shell Chemical Company dissolved in 50 ml. of ethyl acetate to give a hydrocarbon gel composition containing an epoxy resin and an amine curing agent. The gel was sufficiently viscous to suspend sand, and the excess amine present was sufficient to cure the epoxy resin upon heating. Thus, 10 g. of the epoxy-containing gel composition were mixed with 21 g. of sand and the mass was then heated 5 hours at 60° C. to give a hard porous plug of sand held in place by cured epoxy resin.

A variety of oil well treatments have been devised for placing coarse sand or gravel into subterranean structures and binding the packed particles with resins into porous masses which will pass well fluids to the well bore while holding back unconsolidated sand. One method, disclosed in U.S. Pat. No. 3,878,893, employs a slurry of epoxy-coated sand in an oil, together with the necessary curatives and resin solvents. The preferred carrier oils are of medium-to-high viscosity in order to successfully maintain the slurry during the pumping operation. Fluid friction losses with such systems are necessarily great, requiring very high injection pressures to place the mass at the bottom of the well bore. The gelled compositions of the instant invention readily suspend large amounts of sand and exhibit remarkable reductions in fluid friction losses, thus permitting significant handling improvement in the placing of sand or gravel packs in unconsolidated subterranean formations. As demonstrated by Example 14, these compositions may be prepared with an excess of amine and tolerate the presence of uncured epoxy resins without loss in gel properties, and the resulting gelled oil-sand mixture can be cured with moderate heating to form resin-consolidated sand plug having the necessary porosity.

Alternate methods of providing the gel containing excess amine curatives for epoxy resins will be apparent to those skilled in the art. For example, although the gels will not tolerate an excess of the strongly-basic polyamines such as tetraethylene pentamine (TEPA), it is possible to form the gel by neutralizing the partial aluminum salt with only the requisite amount of TEPA, and then to mix in a sufficient amount of an aromatic amine such as m-phenylene diamine to cure the epoxy resin without destroying the gel. Alternatively, a pseudo double salt gel may be prepared by neutralizing with the requisite amount of an inorganic base such as sodium hydroxide and then the requisite amount of aromatic amine curative may be added without destroying the gel. It will be understood that gels which contain no excess amine are not capable of initiating curing of the epoxy resin even on prolonged heating at moderate temperatures.

The invention will thus be seen to be a gelled hydrocarbon composition comprising a liquid hydrocarbon, a partial aluminum salt of an alkyl acid orthophosphate and a neutralizing amount of a polyamine and a method for preparing the gel. The gelled hydrocarbon compositions are capable of tolerating an excess of aromatic polyamines, and are therefore useful in providing gelled compositions containing uncured epoxy resins together with curatives which will become cured upon being heated. Further modifications will be apparent to those skilled in the art which do not depart from the spirit and scope of the invention, and the invention is defined solely by the appended claims.

We claim:

1. A gelled hydrocarbon composition comprising a liquid hydrocarbon, a partial aluminum salt of an alkyl acid ortho-phosphate, said partial aluminum salt having a P/Al ratio in the range of from 2.86/1 to about 10/1, said alkyl acid ortho-phosphate being a mixture of a monoalkyl diacid orthophosphate and dialkyl monoacid orthophosphate wherein the alkyl groups comprise a mixture of at least one $C_1$ to $C_5$ alkyl radical and at least one radical selected from the group consisting of $C_6$ to $C_{22}$ alkyl radicals and $C_6$ to $C_{22}$ alkenyl radicals, and a neutralizing amount of a polyamine compound selected from the group consisting of ethylene diamine, diethylene triamine, triethylene tetramine, tetraethylene pentamine, polyfunctional aromatic amines, and mixtures thereof.

2. The composition of claim 1 further comprising an epoxy resin and a curing amount of an aromatic diamine.

3. A method of making a gelled hydrocarbon composition comprising the steps of dispersing from 0.1 to 10 parts by weight of a partial aluminum salt of an alkyl acid orthophosphate having a P/Al ratio in the range 2.86/1 to about 10/1, said alkyl acid orthophosphate being a mixture of a monoalkyl diacid orthophosphate and a dialkyl monoacid orthophosphate wherein the alkyl groups comprise a mixture of at least one $C_1$ to $C_5$ alkyl radical and at least one radical selected from the group consisting of $C_6$ to $C_{22}$ alkyl radicals and $C_6$ to $C_{22}$ alkenyl radicals, and a neutralizing amount of a polyamine selected from the group consisting of ethylene diamine, diethylene triamine, triethylene tetramine, tetraethylene pentamine, polyfunctional aromatic amines, and mixtures thereof.

4. The method of claim 3 further comprising the steps of adding an uncured epoxy resin and a curing amount of an aromatic diamine.

5. The gelled hydrocarbon composition of claim 1 wherein the polyfunctional aromatic amine is selected from the group consisting of phenylene diamine, methylene dianiline, and oxydianiline.

6. The method of claim 3 wherein the polyfunctional aromatic amine is selected from the group consisting of phenylene diamine, methylene dianiline and oxydianiline.

* * * * *